United States Patent
Sangameswaran et al.

(10) Patent No.: US 8,690,731 B1
(45) Date of Patent: Apr. 8, 2014

(54) SYSTEM AND METHOD FOR CONTROLLING A STOP-START SYSTEM FOR A VEHICLE ENGINE

(71) Applicant: Ford Global Technologies, LLC, Dearborn, MI (US)

(72) Inventors: Sangeetha Sangameswaran, Troy, MI (US); Scott R. Caudill, Saline, MI (US); Mark Douglas Malone, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/690,926

(22) Filed: Nov. 30, 2012

(51) Int. Cl.
*B60W 10/04* (2006.01)
(52) U.S. Cl.
USPC .......................................................... 477/111
(58) Field of Classification Search
None
See application file for complete search history.

(56) References Cited

U.S. PATENT DOCUMENTS

| | | | |
|---|---|---|---|
| 6,190,284 B1 * | 2/2001 | Kuroda et al. | 477/107 |
| 6,676,565 B2 | 1/2004 | Mizutani | |
| 6,830,534 B2 * | 12/2004 | Seibertz et al. | 477/92 |
| 6,885,113 B2 | 4/2005 | Lim | |
| 8,550,959 B2 * | 10/2013 | Ueki | 477/110 |
| 8,574,123 B2 * | 11/2013 | Nedorezov et al. | 477/92 |
| 8,616,169 B2 * | 12/2013 | Levasseur et al. | 123/179.4 |
| 2010/0076634 A1 | 3/2010 | Brigham | |
| 2011/0166745 A1 | 7/2011 | Tiwari et al. | |
| 2012/0010792 A1 | 1/2012 | Nedorezov et al. | |
| 2012/0116657 A1 | 5/2012 | Kawamoto | |
| 2014/0011637 A1 * | 1/2014 | Hayashi et al. | 477/99 |

FOREIGN PATENT DOCUMENTS

EP    1052399 A2    11/2000

* cited by examiner

*Primary Examiner* — Dirk Wright
(74) *Attorney, Agent, or Firm* — David B. Kelley; Brooks Kushman, P.C.

(57) ABSTRACT

A system and method for controlling a start-stop system for an engine in a vehicle includes automatically stopping the engine when the vehicle is in NEUTRAL and automatically restarting the engine when the vehicle is shifted out of NEUTRAL and at least one condition is met. The at least one condition may include the direction of movement of a transmission gear lever. Automatic restarting of the engine is suppressed when the vehicle is shifted out of NEUTRAL and at least one other condition is met. The at least one other condition may also include the direction of movement of the transmission gear lever.

20 Claims, 3 Drawing Sheets

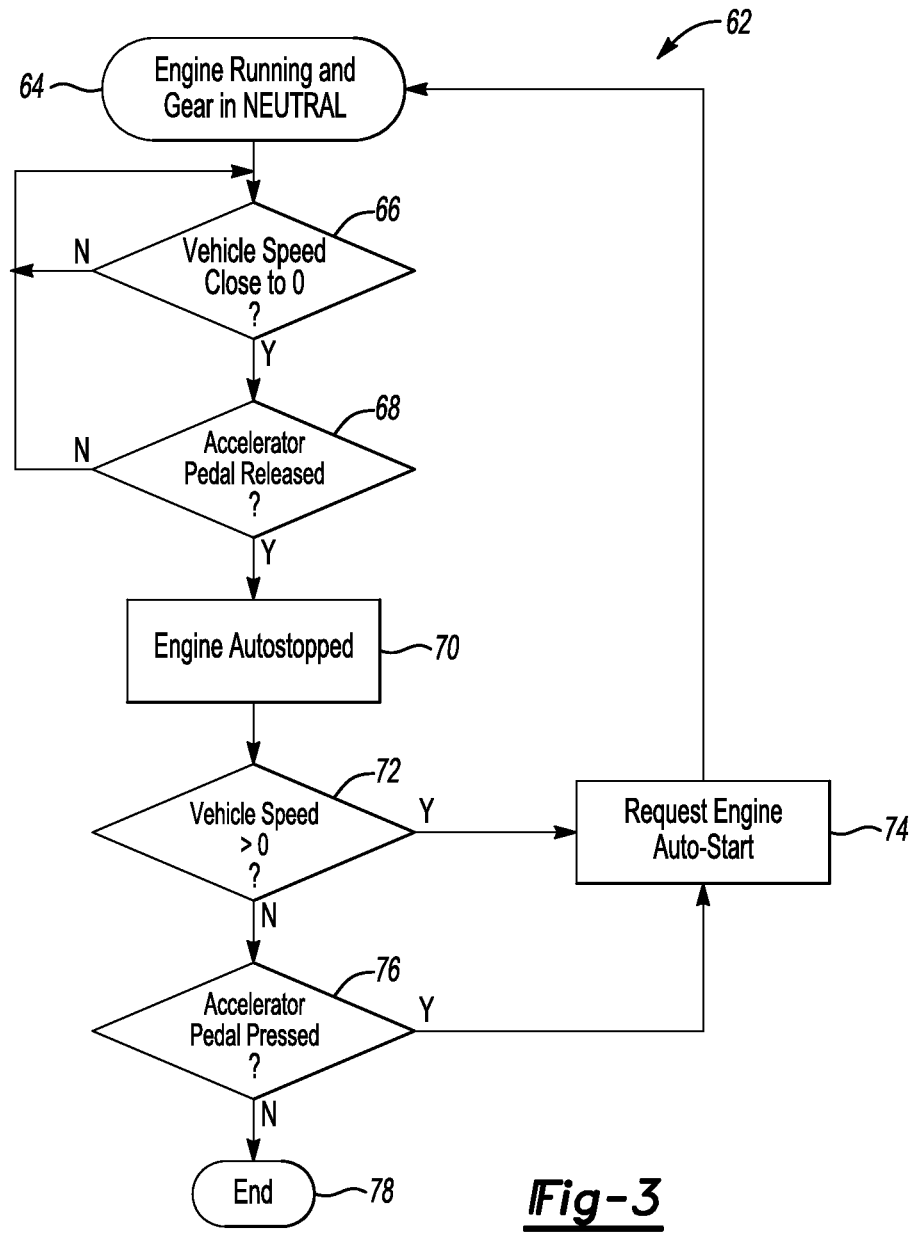

SYSTEM AND METHOD FOR CONTROLLING A STOP-START SYSTEM FOR A VEHICLE ENGINE

TECHNICAL FIELD

The present invention relates to a system and method for controlling a stop-start system for an engine in a vehicle.

BACKGROUND

In vehicles with enhanced starter motor technology, for example, micro hybrid vehicles, the engine is automatically stopped and restarted by a control system under certain conditions—e.g., when the vehicle is stopped. One type of start-stop system for a vehicle with an automatic transmission is a "Stop-in-Drive" system (SID). In such a system, the engine will only be autostopped when the transmission gear lever is in the "DRIVE" position. The engine is restarted when the gear lever is moved out of DRIVE.

In certain situations, a driver may want to have the vehicle in "NEUTRAL" for a period of time and does not require the engine to be running. In a conventional SID system, however, the engine will be autostarted when the vehicle is shifted out of DRIVE. This may reduce one of the benefits of an automatic engine start-stop system, by unnecessarily starting the engine when it is not required. If the engine was autostopped with the vehicle in NEUTRAL, it may be desirable to restart the engine when the vehicle is shifted out of NEUTRAL; however, if the vehicle was autostopped while in DRIVE, the gear lever may be in NEUTRAL only on its way to the final destination of "PARK". In such a case it would be more desirable to keep the engine from automatically restarting when the vehicle is shifted out of NEUTRAL.

Therefore, a need exists for a system and method to control an engine in a vehicle such that after being autostopped and the transmission gear lever is shifted out of NEUTRAL, the vehicle engine will be automatically restarted under certain conditions, but not others.

SUMMARY

At least some embodiments of the present invention include a method for controlling a start-stop system for an engine in a vehicle, including automatically restarting the engine under at least one condition that includes a direction of movement of a transmission gear lever, and suppressing automatic restarting of the engine under at least one other condition that also includes the direction of movement of the gear lever, when the engine has been autostopped and the gear lever is shifted out of NEUTRAL.

At least some embodiments of the present invention include a method for controlling a start-stop system for an engine in a vehicle, including automatically stopping the engine with the vehicle is in NEUTRAL. The method also includes automatically restarting the engine when the vehicle is shifted out of NEUTRAL and at least one condition is met that includes a direction of movement of a transmission gear lever. The method further includes suppressing automatic restarting of the engine when the vehicle is shifted out of NEUTRAL and at least one other condition is met. The at least one other condition also includes a direction of movement of the gear lever.

At least some embodiments of the present invention include a control system for controlling a start-stop system for an engine in a vehicle, including a controller configured to automatically restart the engine under at least one condition that includes a direction of movement of a transmission gear lever, and suppress automatic restarting of the engine under at least one other condition that also includes a direction of movement of a transmission gear lever, when the engine has been autostopped and a gear lever of a transmission is shifted out of NEUTRAL.

BRIEF DESCRIPTION OF THE DRAWINGS

FIG. 3 is a flow chart illustrating a method in accordance with embodiments of the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
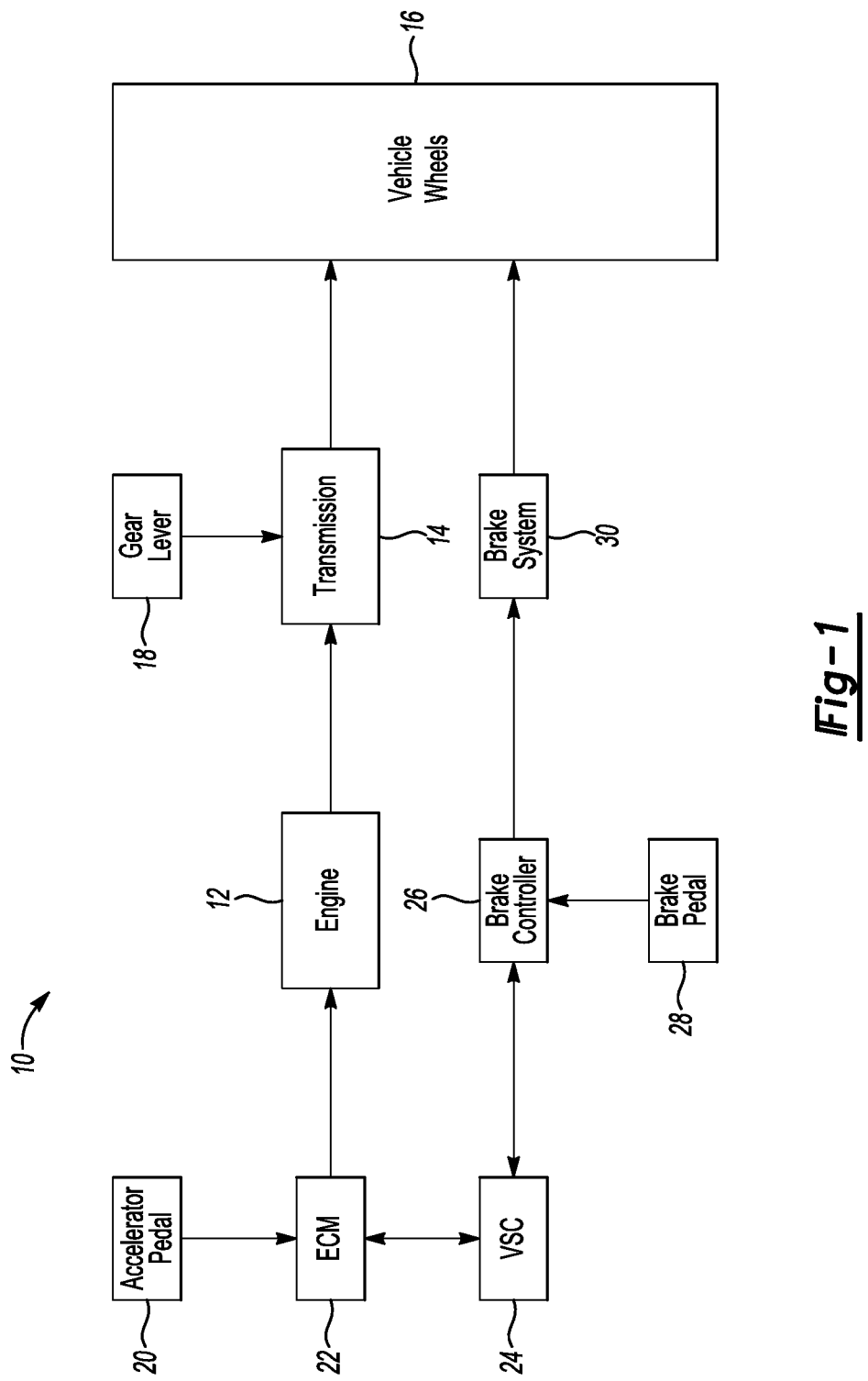
FIG. 1 shows a simplified schematic diagram of a vehicle having a control system in accordance with embodiments of the present invention.

FIG. 1 shows a vehicle 10 including an engine 12 having an output directed to an automatic transmission 14, which in turn transfers power to vehicle wheels 16. A gear lever 18 provides operator input to the transmission 14, and may have any of a number of different configurations, such as PRNDL, PRNDS, PRND D3 D2 D1, etc. An accelerator pedal 20 provides operator input to an engine control module (ECM) 22, which provides control signals to the engine 12. The ECM 22 communicates with a vehicle system controller (VSC) 24, which in turn communicates with a brake controller 26. The brake controller 26 receives operator input through a brake pedal 28, and controls a friction brake system 30, which is operable to apply a braking force to the vehicle wheels 16.

As noted above, embodiments of the present invention include a control system for controlling a start-stop system for an engine in a vehicle, such as the engine 12 and the vehicle 10. Such a control system may be embodied by one or more controllers, such as the ECM 22 or the VSC 24, but more generally may include any number of hardware and/or software controllers residing in different parts of the vehicle and communicating with one another, for example, through a controller area network (CAN). One goal of a vehicle start-stop system is to automatically stop the engine under certain conditions, while restarting it automatically when conditions change. This provides greater fuel economy and reduced emissions.

In some start-stop systems, the engine may be automatically stopped when all of a certain set of conditions are met. For example, if the gear lever is in DRIVE, the brake pedal is pressed, the accelerator pedal is released, and the vehicle speed is close to zero, the engine may be automatically stopped. Another condition that may be included in this set of conditions is that no vehicle subsystem requires the engine to be running—e.g., high power-consuming subsystems such as air conditioning or power steering. In a start-stop system where all conditions are required to be met before the engine is autostopped, not only will the start-stop system keep the engine from being automatically stopped if any of the conditions in the set are not met, but once having been autostopped, the engine may be automatically restarted if any of the conditions change.

Continuing then with the example from above, if the engine has been autostopped while the vehicle is in DRIVE, the engine will be automatically restarted if the operator shifts out of DRIVE. As discussed above, this may be undesirable, particularly if the operator intends to place a vehicle in NEUTRAL for some period of time and does not require the engine to be running. Therefore, in at least some embodiments of the present invention, a controller, which may be for example the engine controller 22, is configured to account for these different requirements. For example, when the engine 12 has been autostopped and the gear lever 18 is in NEUTRAL, the engine controller 22 may be configured to automatically restart the engine 12 when the gear lever 18 is shifted out of NEUTRAL and at least one condition is met, and further configured to suppress automatic restarting of the engine 12 when the gear lever 18 is shifted out of NEUTRAL and at least one other condition is met.

It is worth noting that when the engine 12 has been autostopped and the gear lever 18 is in NEUTRAL, the engine 12 may have been autostopped with the vehicle 10 in another gear, such as DRIVE, and the gear lever 18 moved to NEUTRAL, or the engine 12 may have been autostopped while the vehicle 10 was in NEUTRAL. Embodiments of the present invention may treat these two situations differently, and in such cases, it may be desirable to know what gear the vehicle 10 was in at the time the engine 12 was autostopped. One way to determine this would be to include in the vehicle 10 a "state machine", which could be, for example, software programmed into a controller such as the VSC 24. Although such a state machine could directly determine which gear the vehicle 10 was in at the time the engine 12 is autostopped, it may undesirably increase the complexity of the control system programming. Another way to make this determination would be to measure the time that the vehicle was in NEUTRAL, and if it was greater than a certain time—e.g., 300 milliseconds (ms)—then for purposes of the start-stop system, the controller 22 would assume that the engine 12 was autostopped with the vehicle in NEUTRAL. If, however, the vehicle was in NEUTRAL for less than the certain time, the controller 22 would proceed as if the engine 12 was autostopped with the vehicle in another gear, such as DRIVE.

In at least some embodiments, the at least one condition discussed above may include the gear lever 18 being moved out of NEUTRAL away from REVERSE/PARK—i.e., the gear lever 18 is moved toward DRIVE—whereupon the engine 12 is automatically restarted. The at least one condition could alternatively include the gear lever 18 being moved out of NEUTRAL toward REVERSE/PARK and the engine 12 having been autostopped with the vehicle in NEUTRAL, whereupon the engine 12 is automatically restarted. Because it may be desirable, or even required pursuant to regulations, to suppress engine autostart with a vehicle in REVERSE unless the brake pedal is pressed, in at least some embodiments of the present invention the at least one condition may include: (1) the gear lever 18 being moved out of NEUTRAL toward REVERSE/PARK, (2) the gear lever 18 having a final position of REVERSE, and (3) the brake pedal 28 being pressed; if all of these three conditions are met, the engine 12 is automatically restarted.

To determine whether the gear lever 18 is in a "final" position, a control system may, for example, determine the time that the gear lever 18 has been in a particular position, and if it has been in that position for longer than a predetermined time, it may be considered that this position is the "final" position for purposes of the start-stop system. The predetermined time may be referred to as a "debounce period", and may be, for example, between 0.1 and 1 seconds—i.e., a time range covering most drivers' shifting habits. With regard to the example above, if the gear lever 18 is in REVERSE for at least the predetermined time period, the control system will act as though REVERSE is the final position.

Embodiments of the present invention may also include a control system that further includes providing an alert to the vehicle driver to press the brake pedal 28 when the gear lever 18 is moved from NEUTRAL to REVERSE and the brake pedal 28 is not pressed. The control system may then be configured to deactivate the start-stop system when the brake pedal is not pressed within a predetermined time after the alert. In such a case, automatic restarting of the engine 12 is suppressed.

As described above, the ECM 22 may be configured to automatically start the engine 12 under at least one condition, and may suppress engine auto starting under at least one other condition. In at least some embodiments, the at least one other condition may include: (1) the gear lever 18 being moved out of NEUTRAL toward REVERSE/PARK, (2) the gear lever 18 having a final position of PARK, and (3) the engine 12 having been autostopped with the vehicle 10 in DRIVE; if all three of these conditions are met, automatic restarting of the engine 12 is suppressed.

Figure 2:
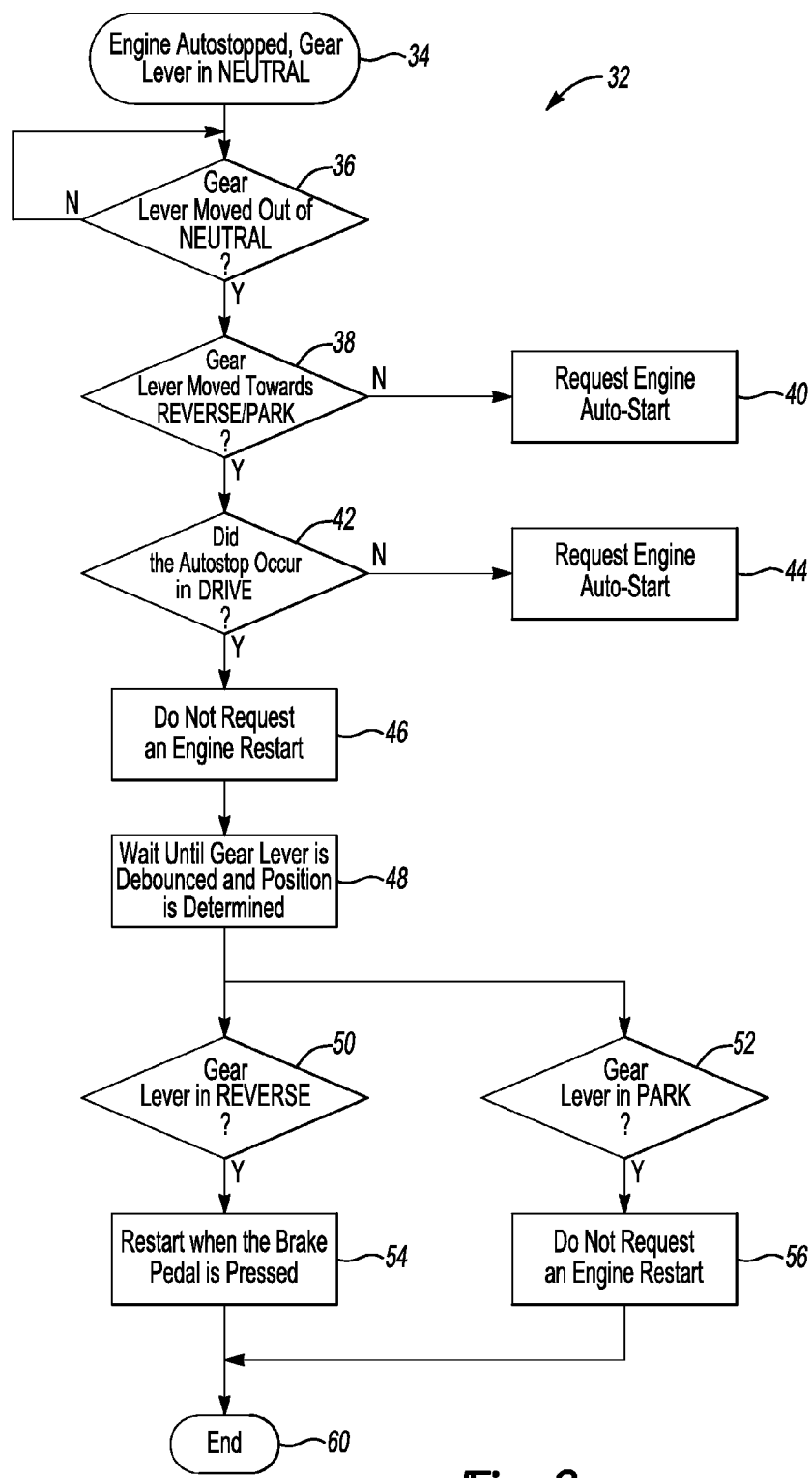
FIG. 2 is a flow chart illustrating a method in accordance with embodiments of the present invention.

FIG. 2 shows a flowchart 32 illustrating a method in accordance with an embodiment of the present invention. The method starts at step 34, where the engine 12 has been autostopped and the gear lever 18 is in NEUTRAL. As described above, this state may indicate that the vehicle 10 was autostopped while in NEUTRAL, or conversely, the vehicle 10 may have been autostopped in another gear and then the gear lever 18 moved to NEUTRAL. At decision block 36, it is determined whether the gear lever 18 is moved out of NEUTRAL. If it was not, the method loops back to make the inquiry again. If, however, it is determined that the gear lever 18 was moved out of NEUTRAL, another inquiry is made at decision block 38.

At decision block 38 it is determined whether the gear lever 18 is being moved towards REVERSE/PARK. This is part of the at least one condition that may be used by the ECM 22 to determine whether the engine 12 should be automatically restarted. If it is determined that the gear lever 18 was not moved toward REVERSE/PARK—i.e., it was moved towards DRIVE—the engine 12 is automatically restarted as shown by the engine autostart request in step 40. If, at decision block 38, it is determined that the gear lever 18 was moved towards REVERSE/PARK, then an inquiry is made as to whether the autostop occurred while the vehicle was in DRIVE.

This inquiry is made at decision block 42, and can be determined, for example, through the use of a state machine or by determining if the gear lever 18 has been in NEUTRAL at least as long as some predetermined time. If it is determined that the autostop did not occur with the vehicle in DRIVE—which in this case indicates that the engine 12 was auto stopped in NEUTRAL—the engine 12 is automatically restarted as shown by the request for engine autostart in step 44. For this part of the method, the at least one condition includes the gear lever 18 being moved out of NEUTRAL toward REVERSE/PARK, and further includes the engine 12 being autostopped with the vehicle in NEUTRAL. As described above, some embodiments of the present invention may impose restrictions on autostarting an engine if the gear lever is moved from NEUTRAL to REVERSE, and the brake pedal is not pressed. In this embodiment, such a restriction is not imposed; however, it will be addressed in another portion of the method as seen below in steps 50 and 54.

Returning to decision block 42, if it is determined that the engine 12 was autostopped with the vehicle in DRIVE, the request to automatically restart the engine 12 is deferred, as shown in step 46. At step 48, the "final" position of the gear lever 18 is determined as described above by waiting for a debounce period to elapse. At decision block 50 it is determined whether the final position of the gear lever 18 is REVERSE, and at decision block 52 is determined whether the final position of the gear lever 18 is PARK. Although as these are shown as separate steps, the decisions at 50, 52 may be made as part of a single inquiry, which merely determines what the final position of the gear lever 18 is.

If it is determined at decision block 50 that the gear lever 18 is in REVERSE, the engine 12 will be automatically restarted when the brake pedal 28 is pressed—this is shown in step 54. Thus, for this example, the at least one condition used to determine if the engine 12 should be automatically restarted includes the gear lever 18 being moved from NEUTRAL toward REVERSE/PARK, the gear lever 18 having a final position of REVERSE, and the brake pedal 28 being pressed. When these three conditions are met, the engine 12 is restarted as shown in step 54.

At least some embodiments will provide an alert to the driver if the brake pedal 28 in this situation is not pressed. In such a case, the at least one condition may include the brake pedal 28 being pressed within a certain period of time after the alert is provided. If the brake pedal 28 is not pressed within that time, the start-stop system may be deactivated. In this situation, the "at least one other" condition described above includes the gear lever 18 being moved from NEUTRAL toward REVERSE/PART, the gear lever 18 having a final position of REVERSE, and the brake pedal 28 not being pressed within the certain period of time after the alert is provided. If all of these conditions are met, automatic restarting of the engine 12 is suppressed.

Returning to decision block 52, where it is determined whether the gear lever 18 is in PARK, if the inquiry yields a positive result, automatic restarting of the engine 12 is not requested as shown in step 56. Thus, in this case, the at least one other condition includes the gear lever 18 being moved from NEUTRAL toward REVERSE/PARK, the gear lever 18 having a final position of PARK, and the engine 12 having been autostopped with the vehicle in DRIVE. When these conditions are met, automatic restarting of the engine 12 is suppressed. Regardless of whether the previous step is 54 or 56, the method ends at step 60.

FIG. 3 shows a flowchart 62 illustrating a method in accordance with an embodiment of the present invention. The method starts at step 64 where the engine 12 is running and the gear lever 18 is in NEUTRAL. At decision block 66, an inquiry is made as to whether the speed of the vehicle 10 is close to zero. An inquiry of this type may be implemented by determining whether a speed of the vehicle 10 is at or below a predetermined speed, such as 5 miles per hour (mph), or even less. If the speed of the vehicle 10 is not close to zero—i.e., it is greater than the predetermined speed—the method loops back and the inquiry is repeated. If, however, the speed of the vehicle 10 is less than the predetermined speed, another inquiry is made at decision block 68 as to whether the accelerator pedal 20 is released. If it is not, the method again loops back and starts with the inquiry at decision block 66. If, however, the answers to both inquiries at decision blocks 66, 68 are positive, the engine 12 is autostopped at step 70.

The method then determines whether the engine 12 should be automatically restarted. The first inquiry is at decision block 72, where it is determined whether the vehicle speed is no longer close to zero—e.g., whether the vehicle speed is above the predetermined speed. This could occur as a result of, for example, the vehicle 10 being on an incline and the brake pedal 28 not being pressed. If it is determined at decision block 72 that the speed of the vehicle is above the predetermined speed, the engine 12 is automatically restarted, as shown by the engine autostart request at step 74. Another criterion that may be used to initiate an engine autostart request is shown at decision block 76, where it is determined whether the accelerator pedal 20 is pressed. If not, the method ends at step 78; however, if the accelerator pedal 20 is pressed, the engine 12 is automatically restarted as shown by the engine autostart request at step 74. Thus, in addition to providing flexibility in a start-stop system that autostops the engine when the vehicle is in DRIVE, the aforementioned method provides a "Stop-in-Neutral" system that may provide even greater fuel economy and emissions reduction.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a start-stop system for an engine in a vehicle, comprising:
   automatically restarting the engine under at least one condition that includes a direction of movement of a transmission gear lever, and suppressing automatic restarting of the engine under at least one other condition that includes the direction of movement of the gear lever, when the engine has been autostopped and the gear lever is shifted out of NEUTRAL.

2. The method of claim 1, wherein the at least one condition includes the gear lever being moved out of NEUTRAL away from REVERSE/PARK, whereupon the engine is automatically restarted.

3. The method of claim 1, wherein the at least one condition includes the gear lever being moved out of NEUTRAL toward REVERSE/PARK and further includes the engine being autostopped with the vehicle in NEUTRAL, whereupon the engine is automatically restarted.

4. The method of claim 1, wherein the at least one condition includes: the gear lever being moved from NEUTRAL toward REVERSE/PARK, the gear lever having a final position of REVERSE, and a brake pedal of the vehicle being pressed, whereupon the engine is automatically restarted.

5. The method of claim 1, further comprising alerting a driver of the vehicle to press a brake pedal when the gear lever is moved from NEUTRAL to REVERSE and the brake pedal is not pressed.

6. The method of claim 5, wherein the at least one condition includes: the gear lever being moved from NEUTRAL toward REVERSE/PARK, the gear lever having a final position of REVERSE, and the brake pedal being pressed within a predetermined time after the alert, whereupon the engine is automatically restarted.

7. The method of claim 6, wherein the at least one other condition includes: the gear lever being moved from NEUTRAL toward REVERSE/PARK, the gear lever having a final position of REVERSE, and the brake pedal not being pressed within the predetermined time after the alert, whereupon automatic restarting of the engine is suppressed.

8. The method of claim 1, wherein the at least one other condition includes: the gear lever being moved from NEUTRAL toward REVERSE/PARK, the gear lever having a final position of PARK, and the engine having been autostopped with the vehicle in DRIVE, whereupon automatic restarting of the engine is suppressed.

9. A method for controlling a start-stop system for an engine in a vehicle, comprising:
   autostopping the engine with the vehicle in NEUTRAL; and
   autostarting the engine based on at least one condition that includes a direction of movement of a transmission gear lever, and suppressing autostarting of the engine based on at least one other condition that includes the direction of movement of the gear lever, when the vehicle is shifted out of NEUTRAL.

10. The method of claim 9, wherein the engine is autostopped when a speed of the vehicle is at or below a predetermined speed and an accelerator pedal of the vehicle is released.

11. The method of claim 10, further comprising autostarting the engine when the speed of the vehicle increases such that it is over the predetermined speed, whereupon the engine is automatically restarted.

12. The method of claim 10, further comprising autostarting the engine when the vehicle speed remains at or below the predetermined speed and the accelerator pedal is pressed, whereupon the engine is automatically restarted.

13. The method of claim 9, wherein the at least one condition includes the vehicle being shifted out of NEUTRAL away from REVERSE/PARK, whereupon the engine is automatically restarted.

14. The method of claim 9, wherein the at least one other condition includes: the gear lever being moved from NEUTRAL toward REVERSE/PARK, the gear lever having a final position of PARK, and the engine having been autostopped with the vehicle in DRIVE, whereupon automatic restarting of the engine is suppressed.

15. A control system for controlling a start-stop system for an engine in a vehicle, comprising:
   a controller configured to autostart the engine under at least one condition that includes a direction of movement of a transmission gear lever, and suppress engine autostarting under at least one other condition that includes the direction of movement of the gear lever, when the engine has been autostopped and the gear lever is shifted out of NEUTRAL.

16. The control system of claim 15, wherein the at least one condition includes the gear lever being moved out of NEUTRAL away from REVERSE/PARK, whereupon the engine is automatically restarted.

17. The control system of claim 15, wherein the at least one condition includes the gear lever being moved out of NEUTRAL toward REVERSE/PARK and further includes the engine being autostopped with the vehicle in NEUTRAL, whereupon the engine is automatically restarted.

18. The control system of claim 15, wherein the at least one condition includes: the gear lever being moved from NEUTRAL toward REVERSE/PARK, the gear lever having a final position of REVERSE, and a brake pedal of the vehicle being pressed, whereupon the engine is automatically restarted.

19. The control system of claim 18, further comprising:
   alerting a driver of the vehicle to press the brake pedal when the gear lever is moved from NEUTRAL to REVERSE and the brake pedal is not pressed; and
   deactivating the start-stop system when the brake pedal is not pressed within a predetermined time after the alert.

20. The control system of claim 15, wherein the at least one other condition includes: the gear lever being moved out of NEUTRAL toward REVERSE/PARK, the gear lever having a final position of PARK, and the engine having been autostopped with the vehicle in DRIVE, whereupon automatic restarting of the engine is suppressed.

* * * * *